Jan. 26, 1932.                R. W. BROWN                  1,842,818
                         TIRE BALANCING MACHINE
                          Filed Oct. 2, 1929           5 Sheets-Sheet 3
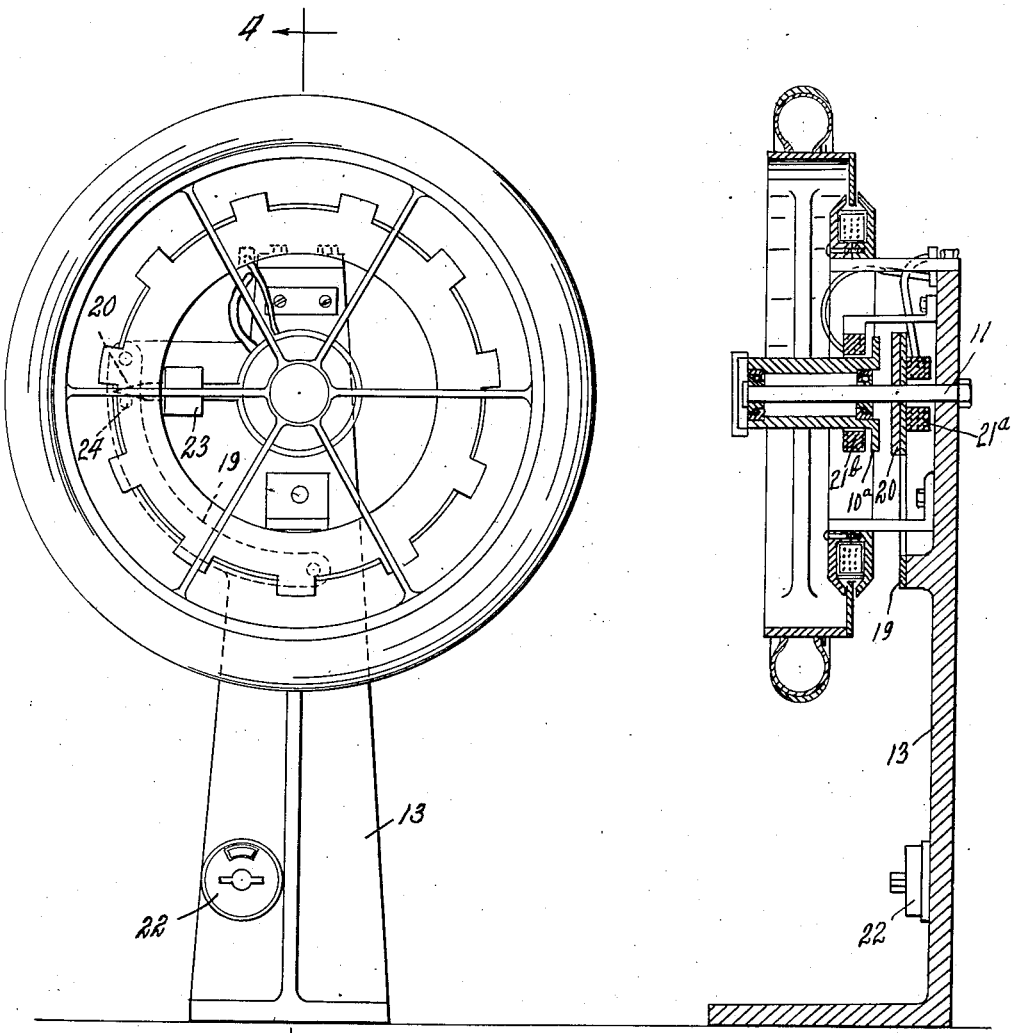
Fig.3.                              Fig.4.
                                            INVENTOR.
                                         Roy W. Brown.
                                    BY    Ely & Barrow
                                                    ATTORNEYS.

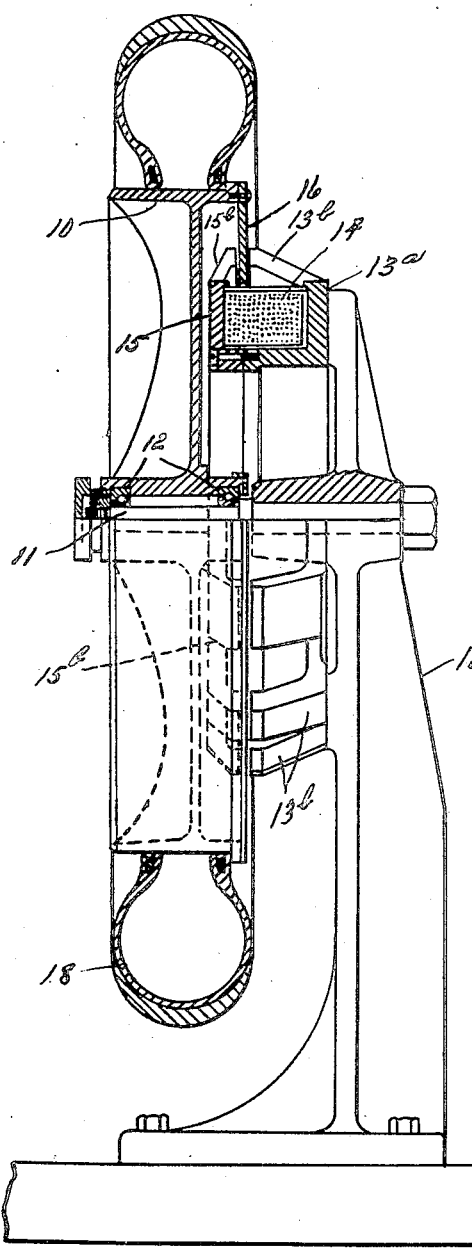

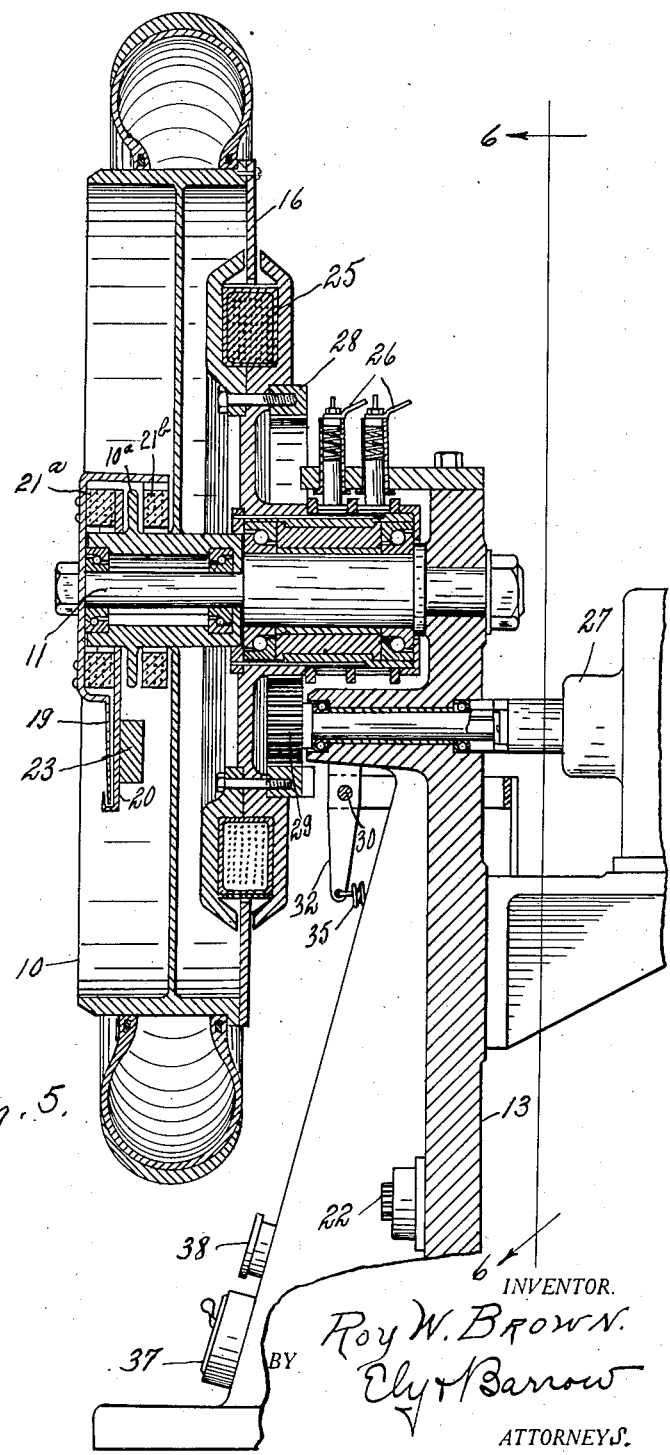

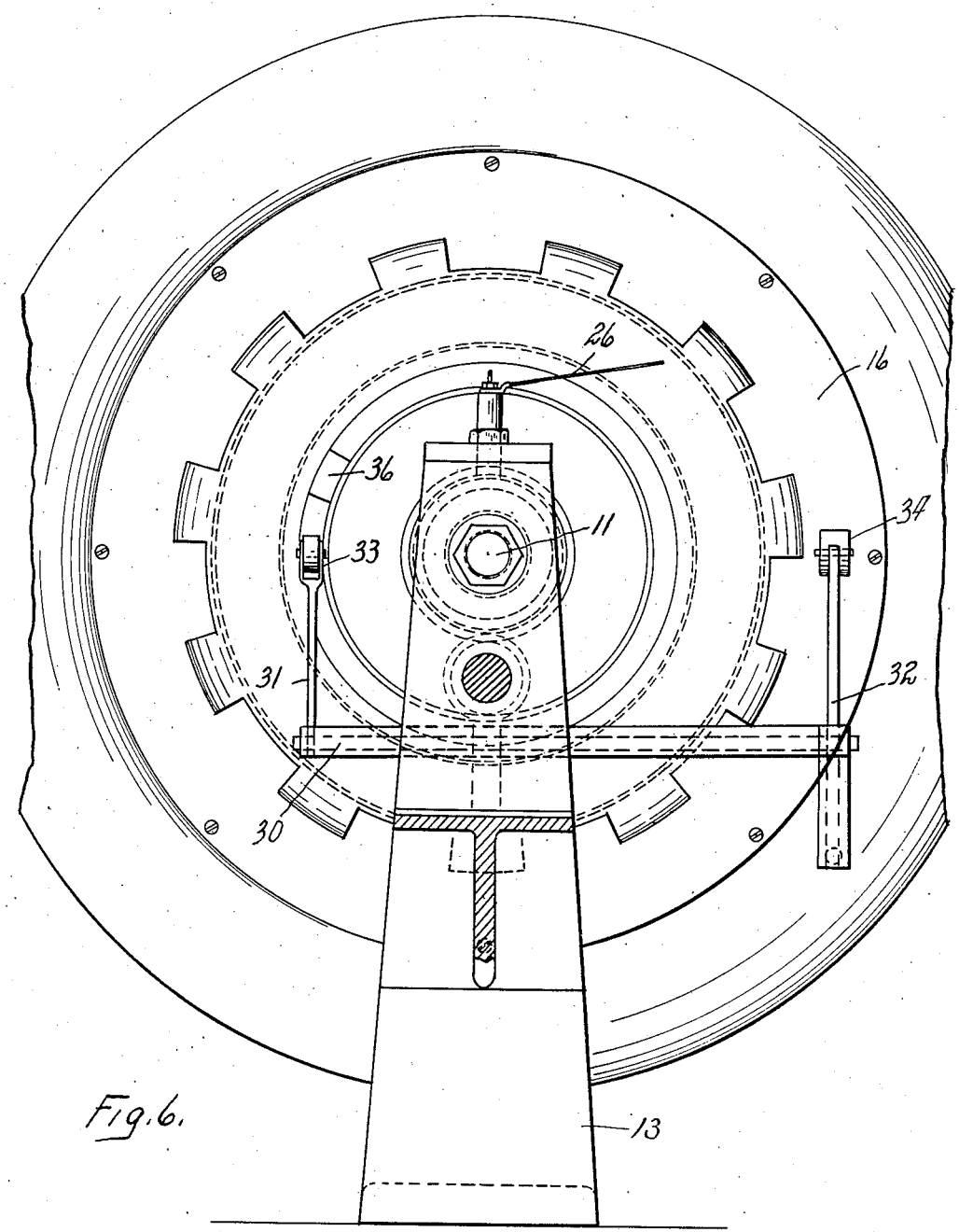

Patented Jan. 26, 1932

1,842,818

UNITED STATES PATENT OFFICE

ROY W. BROWN, OF AKRON, OHIO, ASSIGNOR TO THE FIRESTONE TIRE & RUBBER COMPANY, OF AKRON, OHIO, A CORPORATION OF OHIO

TIRE BALANCING MACHINE

Application filed October 2, 1929. Serial No. 396,646.

This invention relates to tire balancing machines and more particularly to means for weighing the amount by which the tire is out of balance.

Regardless of care and skill in construction, completed tires are very apt to be out of balance. That is, when a tire is mounted on a freely turning wheel there will be a portion of the tire heavier than the rest, which portion tends to turn to the bottom of the wheel due to gravity. The tire being out of balance, thus renders the whole wheel assembly out of balance with the usual undesirable results, such as wear on the bearings, jerkiness, etc., which follow when any wheel is unbalanced. It has also been found that tires when out of balance contribute to shimmy and play in the steering mechanism of automobiles. This is especially true of low pressure balloon tires.

It is an object of this invention to provide means for quickly and accurately finding the heavy spot in a tire.

Again an object of the invention is to weigh the amount by which a tire is out of balance, which amount can readily be compared with a determined standard to see if the tire is fit for service.

Other and further objects will be apparent from the disclosure, it being understood that the invention is not limited to the specific embodiment described and shown in the accompanying drawings.

In the accompanying drawings:

Figure 2 is a side elevation of Figure 1, a portion thereof being cut away to more adequately disclose the construction;

Figure 3 is a front elevation of a modified form of the invention;

Figure 4 is a sectional view of Figure 3 taken on line 4—4 thereof;

Figure 5 is a diametral sectional view of a modified form of a tire balancing machine embodying the invention; and Figure 6 is a view on line 6—6 of Figure 5 showing a rear elevation of the machine.

Figure 1:
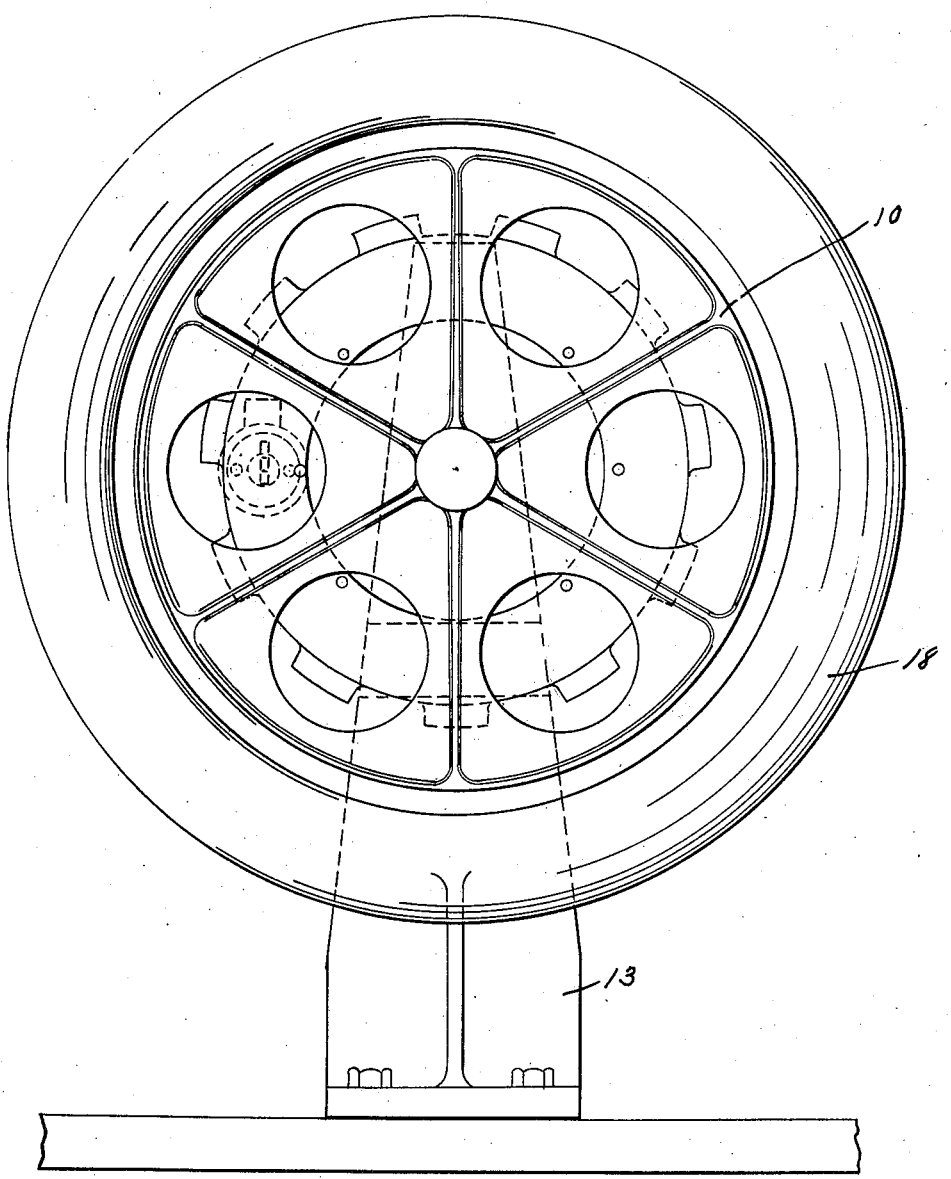
Figure 1 is a front elevation of a magnetic tire balancing machine embodying the invention.

The embodiment of the invention shown in Figures 1 and 2 is the simplest and will be described first. A balanced wheel 10 preferably formed of suitable light weight metal to reduce the inertia thereof is journaled on a stub axle 11 through the agency of frictionless bearings 12. A bracket or standard 13 is provided to support the stub axle 11 and is flanged as at 13$^a$ to receive a circular electro-magnet coil 14. In order to properly hold the magnet coil in position and to complete the magnet assembly, a ring 15 is arranged to cooperate with the flange 13$^a$. The ring 15 and the flange 13 are formed with lugs 15$^b$ and 13$^b$ respectively which serve as oppositely charged poles in the magnet assembly. The wheel 10 is provided with a back plate 16 which extends down between the lugs 15$^b$ and 13$^b$ on the magnet assembly. The numeral 18 indicates a tire which is to be balanced upon the machine, the inside diameter of the tire being such that it has a sliding fit on the wheel 10.

In the tire balancing operation the magnetic coil 14 is energized and a tire is slipped on the wheel. When the coil is energized, magnetic lines of force will flow between lugs 15$^b$ and 13$^b$ in the magnet assembly, thus passing through the plate 16. If the tire is unbalanced, the wheel being mounted on the frictionless bearings, will tend to turn due to gravity so that the heavy portion of the tire will be down. The force of gravity is counteracted to some extent by the magnetic dampening or drag of the magnet assembly. That is, the magnetic lines of force flowing between the stationary lugs 15$^b$ and 13$^b$ tend to resist any movement of the plate 16 which being fastened to the wheel tends to prevent the rotation of the wheel. This magnetic drag is very desirable in that it offers very little resistance when the wheel is turning slowly but the resistance increases rapidly when the speed of the wheel increases. It is thus seen that the heavy portion of the wheel will turn to the bottom. Various methods can be employed to balance the tire such as making a suitable mark on the top side of the tire indicating the spot where the valve of the inner tube should be placed to counter-balance the heavy portion of the tire. Other methods such as buffing the heavy portion of the tire, etc. may be employed if desired.

The form of the invention shown in Figures 3 and 4 is similar to that above described. However, in addition it provides means whereby the amount of unbalance can be determined and compared with a fixed standard. Such means include a scale 19 fixed to the bracket 13 and a cooperating pointer 20 journaled on the stud axle 11. The hub of the wheel 10 is formed with a flange 10ª thereon and the pointer is adapted to be clamped either against it or against the fixed scale 19. The clamping of the pointer is affected by means of stationary magnet coils 21ª and 21ᵇ mounted behind the scale 19 and the hub flange 10ª respectively, a double throw switch indicated at 22 being arranged to control the flow of current to one or the other of the coils.

On the arm of the pointer 20 is a weight 23, the pointer and weight being adapted to be held in a horizontal position during the balancing operation hereinbefore described by suitable means such as a stop 24 on the scale in conjunction with the magnetic coil 21ª.

The operation is exactly similar to that of the apparatus shown in Figures 1 and 2, only that after the heavy portion of the tire has come to rest at the bottom of the wheel, the coil 21ᵇ is energized and the coil 21ª deenergized by throwing the switch 22, which pulls the pointer off the stop 24 and clamps it against the flanged hub 10ª of the wheel 10. It is apparent that the heavy portion of the tire will thus be at right angles to the pointer and weight and a new balance will be arrived at between the weight and the heavy portion. This balance can be read on the scale 19 and compared with the determined standard.

Figures 5 and 6 show a modified form wherein the stud axle 11 is adapted not only to journal the wheel 10 but to journal the magnet assembly indicated as a whole by the numeral 25. Well known means such as shown at 26 are provided to supply current to the rotating magnet assembly. A synchronous motor 27 is arranged to drive the magnet assembly through suitable means such as an annular rack 28 on the assembly cooperating with a pinion 29 on the motor shaft.

A shaft 30 having a pair of extending arms 31 and 32 fixed at its ends is pivotally supported by the bracket 13. The arm 31 is bifurcated at its end and carries a roller 33 which rides on the annular rack 28. One end of the arm 32 supports a soft rubber cushion 34 which just clears the back plate 16 of the wheel 10. A spring 35 may be provided on the other end of arm 32 to hold the cushion 34 in this position and to hold the roller 33 against the annular rack 28. The roller 33 of course limits the clearance between the soft rubber cushion 34 and the wheel. The annular rack is formed with a depressed portion indicated at 36 which upon rotation of the rack and magnetic assembly periodically causes the rubber cushion 34 to touch the back plate 16 of the wheel which tends to stop any movement of the wheel.

A rheostat 37 and an ammeter 38 can be inserted in the leads supplying current to the magnetic assembly whereby the amount of current supplied thereto can be controlled and measured as desired.

The operation of the form shown in Figures 5 and 6 can be exactly similar to that of either of the methods described heretofore, in which case the motor is not driven and the magnetic assembly thus remains stationary. However, in this form, the synchronous motor is generally employed to constantly rotate the magnetic assembly. A determined amount of current is then supplied to the magnetic assembly and if the tire is not out of balance enough to cause trouble the magnetic drag of the rotating magnetic assembly will be strong enough to rotate the wheel and tire with it. If, however, the tire is sufficiently out of balance so that it will cause undesirable results, then the magnetic drag will be unable to overcome the effect of gravity upon the heavy portion of the tire.

This construction will also allow the amount by which the tire is out of balance to be measured by other means than those described heretofore in the operation of Figures 3 and 4. In this further method, the current supplied to the magnet assembly is initially low and is slowly increased by means of the rheostat 37 until the magnetic drag of the assembly overcomes the pull of gravity on the heavy portion of the tire, whereupon the wheel and tire will rotate with the magnetic assembly. When this occurs the amount of current required therefore can be readily determined from the ammeter 38 which may be calibrated in any suitable units such as pounds of unbalance to indicate the weight of the heavy portion of the tire.

It will be noted that when the tire is inserted on the wheel the heavy portion thereof may be placed near the top of the wheel, in which case the tire and wheel will gain a certain momentum due to gravity on its downward travel. This momentum assisted by the magnetic drag of the rotating magnet assembly will sometimes be sufficiently great so that the magnetic assembly will be capable of rotating the tire and wheel, thus making it appear balanced when it actually is not. Any tendency for this to occur, however, is prevented by the periodically operated wheel, stopping or slowing mechanism indicated by numerals 30 to 36 and described above.

It is apparent that the invention is not limited in application to the specific forms shown and described. Accordingly various modifications other than those set forth herein can be resorted to without departing from the spirit of the invention or the scope of the appended claims.

What is claimed is:

1. In tire balancing apparatus, a support, a horizontal stud axle on said support, a wheel journaled on said axle, said wheel being adapted to receive a tire thereon, and a stationary magnet assembly in proximity to said wheel whereby a dampening or drag is exerted upon the rotation of the wheel.

2. In combination, in a tire balancing machine, a stationary electromagnet assembly, and a wheel arranged to receive a tire thereon, said wheel being provided to rotate closely adjacent said magnet assembly.

3. In tire balancing apparatus, a stationary magnet assembly, oppositely charged magnetic poles on said assembly, a rotatably mounted wheel adapted to receive a tire thereon, said wheel having a portion lying between the oppositely charged poles of said magnet assembly.

4. In tire balancing apparatus, a support, a horizontal stud axle on said support, a wheel journaled on said axle, said wheel being adapted to receive a tire thereon, and a stationary magnet assembly in proximity to said wheel, and oppositely charged poles in said magnet assembly and a portion of said wheels lying between said poles whereby a dampening or drag is exerted upon the rotation of the wheel.

5. In tire balancing apparatus, the combination of a stationary horseshoe shaped magnet assembly, and a pivotally mounted wheel adapted to receive a tire, a portion of said wheel lying between the poles of the horseshoe magnet assembly.

6. In combination, in tire balancing equipment, a support, a horizontal stud axle thereon, a balanced wheel journaled on said axle, a circular, stationary, horseshoe magnet assembly, a plurality of juxtaposed oppositely charged poles on said assembly, and a flange on said wheel lying between the juxtaposed poles of said magnetic assembly.

7. In tire balancing apparatus, a support, a horizontal stud axle carried thereby, a balanced wheel journaled on said axle, a flange on the hub of said wheel, a stationary magnet assembly in proximity to a portion of said wheel, an additional pair of fixed magnet units, one of said pair supported behind the flange on said wheel hub and the other held in spaced relation in front of the flange, a pointer pivotally supported between said flange and said last-named magnet unit and adapted to be magnetically held either in a fixed position by the last-named magnetic unit or against the hub flange by the first-named magnetic unit, and a fixed scale arranged to cooperate with the pointer.

8. In tire balancing apparatus, a support, a horizontal stud axle carried thereby, a balanced wheel journaled on said axle, a flange on the hub of said wheel, a pair of fixed magnet units, one of said pair supported behind the flange on said wheel hub and the other held in spaced relation in front of the flange, and a pointer pivotally supported between said flange and said last-named magnet unit and adapted to be magnetically held either in a fixed position by the last-named magnetic unit or against the hub flange by the first-named magnetic unit.

9. In tire balancing apparatus, a support, a horizontal stud axle carried thereby, a balanced wheel journaled on said axle, a flange on the hub of said wheel, a pair of fixed magnet units, one of said pair supported behind the flange on said wheel hub and the other held in spaced relation in front of the flange, a pointer pivotally supported between said flange and said last-named magnet unit and adapted to be magnetically held either in a fixed position by the last-named magnetic unit or against the hub flange by the first-named magnetic unit, a fixed scale arranged to cooperate with the pointer, and a weight on said pointer and a plurality of means for holding said pointer in a horizontal position during the initial tire balancing operation.

10. In tire balancing apparatus, a balanced wheel, means for rotatably mounting the wheel, a magnetic assembly, means for holding the assembly adjacent to a portion of said wheel, a pointer, means for journaling the pointer in axial proximity to the hub of said wheel, and means for clamping said pointer in a fixed position or against the hub of said wheel.

11. In tire balancing apparatus, a balanced wheel, means for rotatably mounting the wheel, a magnetic assembly, means for holding the assembly adjacent to a portion of said wheel, a pointer, means for journaling the pointer in axial proximity to the hub of said wheel, means for clamping said pointer in a fixed position or against the hub of said wheel, a weight on said pointer, and a scale and means for supporting said scale in a fixed position for cooperation of the pointer therewith.

12. In tire balancing apparatus, a balanced wheel, means for rotatably mounting the wheel, a pointer, means for journaling the pointer in axial proximity to the hub of said wheel, means for clamping said pointer in a fixed position or against the hub of said wheel, a weight on said pointer, a scale, and means for supporting said scale in a fixed position for cooperation of the pointer therewith.

13. In a tire balancing machine, a support, a horizontal stud axle carried thereby, a wheel journaled on said axle, a magnet assembly also journaled on said axle, a portion of said wheel lying within the magnetic field of said magnet assembly, and means for uniformly rotating said magnet assembly.

14. In tire balancing apparatus, a support, a horizontal stud axle on said support, a wheel journaled on said axle, said wheel being adapted to receive a tire thereon, a magnet assembly journaled on said axle in proximity to said wheel, oppositely charged poles in said magnet assembly and a portion of said wheels lying between said poles, and means for uniformly rotating said magnet assembly whereby a drag is exerted upon the wheel.

15. In tire balancing apparatus, a support, a horizontal stud axle on said support, a wheel journaled on said axle, said wheel being adapted to receive a tire thereon, a magnet assembly journaled on said axle in proximity to said wheel, oppositely charged poles in said magnet assembly and a portion of said wheels lying between said poles, means for uniformly rotating said magnet assembly, and additional means for controlling and measuring the current supplied to said magnet assembly to thereby weigh the unbalanced portion of the tire.

16. In a tire balancing machine, a support, a horizontal stud axle carried thereby, a wheel journaled on said axle, a magnet assembly also journaled on said axle, a portion of said wheel lying in proximity to said magnet assembly, means for uniformly rotating said magnet assembly, and additional means operated by the rotation of the magnet assembly for periodically arresting the rotation of the wheel.

17. In a tire balancing machine, a support, a horizontal stud axle carried thereby, a wheel journaled on said axle, a magnet assembly also journaled on said axle, a cam on said magnet assembly, a portion of said wheel lying in proximity to said magnet assembly, means for uniformly rotating said magnet assembly, additional means operated by the rotation of the magnet assembly for periodically arresting the rotation of the wheel, said means including a cam roller riding on the cam on the magnet assembly, and an arm having a rubber cushion thereon, said cam roller being adapted to control the movement of the rubber cushioned arm towards and from the wheel.

18. In combination, in tire balancing equipment, a support, a balanced wheel journaled on said support, a stationary horseshoe magnet assembly mounted on said support, said assembly including a plurality of juxtaposed oppositely magnetized poles and a flange on said wheel lying between the juxtaposed poles of said magnetic assembly.

19. In a tire balancing machine, a support, a wheel journaled on said support, a magnet assembly also journaled on said support, a portion of said wheel lying in proximity to said magnet assembly, means for uniformly rotating said magnet assembly, a pointer, means for journaling the pointer in axial proximity to the hub of said wheel, and means for clamping said pointer alternately in a fixed position or against the hub of said wheel.

20. In combination, in tire balancing equipment, a support, a horizontal stud axle thereon, a balanced wheel journaled on said axle, a stationary horseshoe magnet assembly journaled on said axle, a plurality of juxtaposed oppositely charged poles on said assembly, a flange on said wheel lying between the juxtaposed poles of said magnet assembly, and means for uniformly rotating said magnet assembly.

21. In a tire balancing machine, a support, a horizontal stud axle carried thereby, a wheel journaled on said axle, a magnet assembly also journaled on said axle, a portion of said wheel lying in proximity to said magnet assembly, means for uniformly rotating said magnet assembly, a pointer, means for journaling the pointer in axial proximity to the hub of said wheel, and means for clamping said pointer in a fixed position or against the hub of said wheel.

22. In tire balancing apparatus, a support, a horizontal stud axle on said support, a wheel journaled on said axle, said wheel being adapted to receive a tire thereon, a magnet assembly journaled on said axle in proximity to said wheel, oppositely charged poles in said magnet assembly and a portion of said wheels lying between said poles, a synchronous motor for uniformly rotating said magnet assembly, additional means for controlling and measuring the current supplied to said magnet assembly to thereby weigh the unbalanced portion of the tire, said means including an ammeter calibrated to read in pounds of unbalance and a current controlling rheostat.

ROY W. BROWN.